(12) United States Patent
Lin et al.

(10) Patent No.: US 9,965,665 B2
(45) Date of Patent: May 8, 2018

(54) FINGERPRINT IDENTIFICATION OPTICAL IMAGING PACKAGE STRUCTURE

(71) Applicant: TRON Intelligence, Inc., Taipei Hsinchu County (TW)

(72) Inventors: Ruey Jiann Lin, Hsinchu (TW); Kuo Shu Huang, Hsinchu (TW)

(73) Assignee: Tron Intelligence Inc., Zhubei (TW)

( * ) Notice: Subject to any disclaimer, the term of this patent is extended or adjusted under 35 U.S.C. 154(b) by 128 days.

(21) Appl. No.: 15/040,046

(22) Filed: Feb. 10, 2016

(65) Prior Publication Data

US 2017/0193268 A1    Jul. 6, 2017

Related U.S. Application Data

(60) Provisional application No. 62/114,653, filed on Feb. 11, 2015.

(51) Int. Cl.
*G06K 9/00* (2006.01)

(52) U.S. Cl.
CPC . *G06K 9/00013* (2013.01); *G06K 2009/0006* (2013.01)

(58) Field of Classification Search
CPC ....... G06K 2009/0006; G06K 9/00013; G06K 9/0002; G06K 9/00087; G06F 3/016; G06F 3/0338; G06F 3/041; G06F 3/0416; G06F 3/044; H04N 5/23241; H04N 5/3765; H04N 5/378
See application file for complete search history.

(56) References Cited

U.S. PATENT DOCUMENTS

| | | | |
|---|---|---|---|
| 2009/0080709 A1* | 3/2009 | Rowe | G06K 9/00013 382/115 |
| 2016/0141235 A1* | 5/2016 | Lin | H05K 3/4644 361/760 |
| 2016/0335468 A1* | 11/2016 | Long | G06K 9/0002 |

* cited by examiner

*Primary Examiner* — Yon Couso
(74) *Attorney, Agent, or Firm* — Rosenberg, Klein & Lee

(57) ABSTRACT

A fingerprint identification optical imaging package structure is applied in the field of the fingerprint identification optical system. An isolating base is arranged under a light source device and a height of the isolating base is higher than a height of a sensing base to achieve the effects of light shielding and preventing from being influenced by the heat of the light source. And then, the sensitivity and precision of fingerprint reading and identifying may be increased and improved. At the same time, the volume may be reduced to make the applicability of the structure much broader.

4 Claims, 2 Drawing Sheets

FINGERPRINT IDENTIFICATION OPTICAL IMAGING PACKAGE STRUCTURE

FIELD OF THE INVENTION

The present invention relates to a fingerprint identification optical imaging package structure which is applied in the field of the fingerprint identification optical system. An isolating base is arranged under a light source device and a height of the isolating base is higher than a height of a sensing base to achieve the effects of light shielding and preventing from being influenced by the heat of the light source. And then, the sensitivity and precision of fingerprint reading and identifying may be increased and improved. At the same time, the volume may be reduced to make the applicability of the structure much broader.

BACKGROUND OF THE INVENTION

The identification optical structure of a conventional fingerprint identification system is shown as FIG. 1. A base 11 and a light source device 12 are arranged above a Printed Circuit Board (PCB) 1. A sensing device 111 is arranged above the base 11. A transparent colloid 14 may be packaged on the PCB 1. The light source device 12 may be directly arranged on the PCB 1 and the distribution of the light source may be expanded to a bottom of the base 11. It is usually resulting in the light source passing through the bottom of the base 11 to influence the image formed by the sensing device 111 so that the identification system is read and identified insensitively and then the yield rate is reduced.

In order to solve the problems of the above mentioned structure of FIG. 1, a structure is invented by the applicant which has the effect of light shielding, reduction of the influence of heat generated from the Infrared Light-Emitting Diode (IR LED), low interference, high sensitivity of fingerprint identification, high precision of fingerprint identification, and micro volume.

Accordingly, the inventor of the present invention has devoted himself based on his many years of practical experiences to solve this problem.

SUMMARY OF THE INVENTION

A fingerprint identification optical imaging package structure of the present invention is applied in the field of the fingerprint identification optical system. An isolating base is arranged under a light source device and a height of the isolating base is higher than a height of a sensing base to achieve the effects of light shielding and preventing from being influenced by the heal of the light source. And then, the sensitivity and precision of fingerprint reading and identifying may be increased and improved. At the same time, the volume may foe reduced to make the applicability of the structure much broader.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
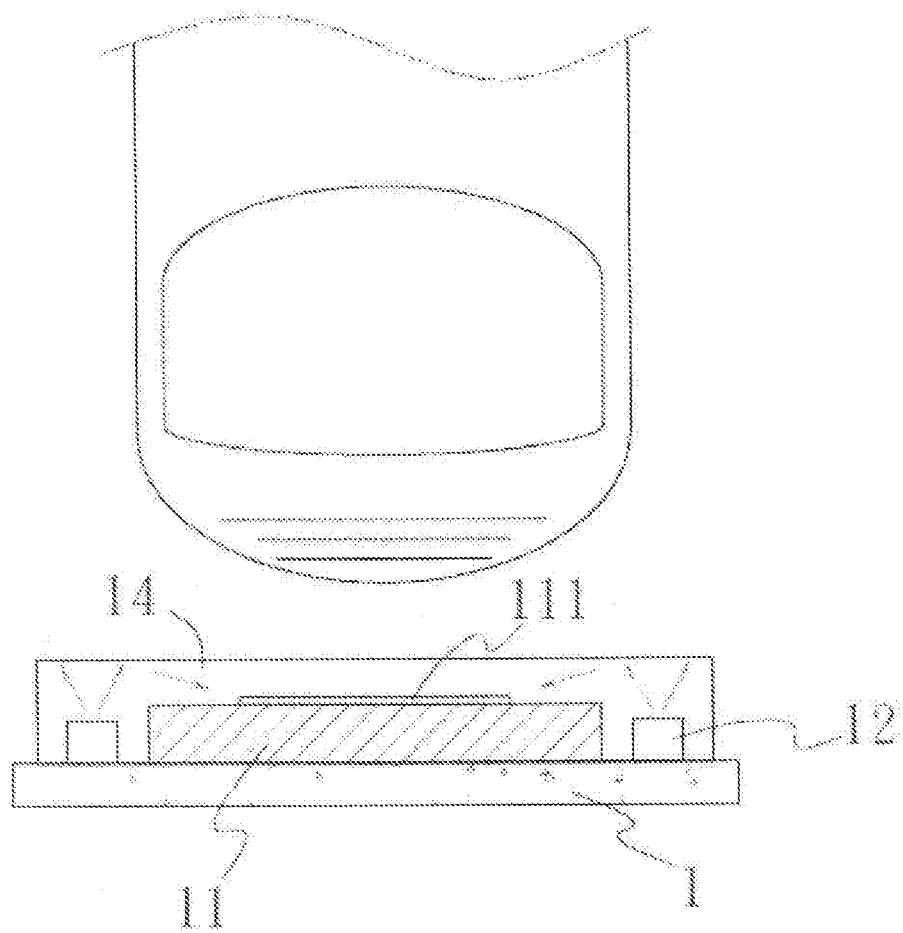
FIG. 1 is a cross-sectional view of a conventional fingerprint identification structure.

Referring now to the drawings where like characteristics and features among the various figures are denoted by like reference characters.

Figure 2:
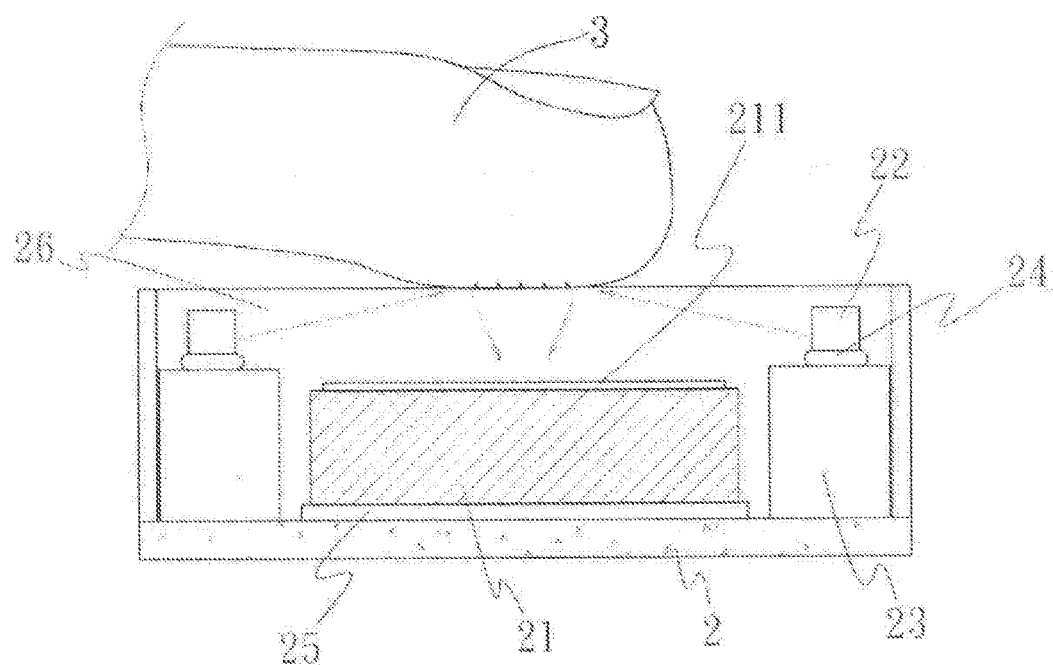
FIG. 2 is a cross-sectional view of a fingerprint identification optical imaging package structure of the present invention.

Please refer to FIG. 2, a fingerprint identification optical imaging package structure of the present invention mainly comprises a circuit board 2, a light source device 22, an isolating device 23, and a transparent colloid 26. A sensing base 21 and the light source device 22 are arranged at the circuit board 2. A sensing device 211 is arranged above the sensing base 21 for reading and identifying a fingerprint. The sensing device 211 may be a CCD (Charge-Coupled Device) or a CMOS (Complementary Metal-Oxide-Semiconductor). The sensing device 211 may be fixed on the sensing base 21 with a silver paste or a red glue 25 to achieve the effects of fixing and electrical connection.

The light source device 22 is arranged at an outer edge of the sensing base 21. The light source device 22 may be an IR LED which is capable for reducing the interference caused by the ambient light source. It is a preferable LED element to provide the light source by itself to compete with the interference source.

The isolating base 23 is arranged under the light source device 22 for isolate from the interference source of light. Simultaneously, the location of the light source device 22 may be raised. The isolating base 23 and the light source device 22 are fixed with the silver paste or the red glue 24 interposed therebetween. A height of the isolating base 23 is higher than a height of the sensing base 21 so that the light of the IR LED may be not passed through the sensing base 21 arranged at a bottom of the sensing device 211 to influence the sensing device 211 to read and identify image (fingerprint). It is the light source shielding. The present invention may prevent the heat of the IR LED from directly transmit to the sensing device 211 and then to reduce the influence degree of the heat source.

The transparent colloid 26 is filled and coated on the outer layers of the sensing base 21 and the light source device 22. That is, the sensing base 21 arranged above the circuit board 2, the sensing device 211, the isolating base 23; and the light source device 22 are all coated thereinside by the transparent colloid 26. The transparent colloid 26 has the characteristic of uniformly distributing the light source of the IR LED of the light source device 22.

When in assembling, the sensing base 21 is fixed above the circuit board 2 with the sliver paste or the red glue 25, and then the isolating base 23 is arranged above the circuit board 2 but located at a peripheral of the sensing base 21. After that: the sensing device 211 is arranged above the sensing base 21, and at the same time, the light source device 22 is fixed above the isolating base 23 with the silver paste or the red glue 24.

Finally, the transparent colloid 26 is coated on the outer layers of the sensing base 21 and the light source device 22. Therefore, the assembly of the fingerprint identification optical imaging package structure is completed. When the structure is in operating, the emitting angle of the light source of the fight source device 22 may not influence the sensing device 211 since the height of the isolating base 23 is higher than the height of the sensing base 21, even the light source may be not passed through the sensing base 21 arranged at the bottom of the sensing device 211. Therefore, it may effectively prevent the light source from influencing the fingerprint identification of the sensing device 211 to achieve the effect of shielding. In addition, since the light source device 2 is raised by the isolating base 23, it may prevent the heat of the IR LED transmitting to the sensing device 211 directly. The influence degree of the heat of the IR LED may be reduced. When an user puts his/her finger 3 on a fingerprint identification area and close to the top of the sensing device 211, the light source of the light source device 22 may penetrate into the skin of the finger 3 and the sensing device 211 may detect wave peaks and wave valleys alternating with black and white (that is, the peak is bright and the valley is dark) formed by the fingerprint so that a pattern of the fingerprint of the user may be detected to achieve the effects of fingerprint imaging and identification.

In conclusion, compared to the conventional fingerprint imaging structure, the fingerprint identification optical imaging package structure of the present invention may not only achieve the effects of light shielding and reduce the heat to influence the reading and identifying, but also make the light source above the sensing device 211 is sufficient to light up the fingerprint of the finger 3 more clearly due to the light source device 22 is raised by the isolating base 23. The fingerprint identification optical imaging package structure of the present invention is easy to be processed and the elements thereof are simplified so as to effectively reduce manufacturing cost and increase production. Simultaneously, the structure is simplified to make the volume smaller and the weight lighter and be suitable for applying to various products.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A fingerprint identification optical imaging package structure, comprising: a circuit board, having a sensing base arranged thereon, and a sensing device is arranged on the sensing base; an isolating base, arranged on the circuit board and located at a peripheral of the sensing base, a height of the isolating base is higher than a height of the sensing base; a light source device, arranged above the isolating base and disposed at one side of the sensing base; and a transparent colloid, coated on the sensing base, the sensing device, the isolating base, and the light source device.

2. The structure as claimed in claim 1, wherein the light source device is an IR LED (Infrared Light-Emitting Diode).

3. The structure as claimed in claim 1, wherein the light source device and the sensing base are respectively fixed on the isolating base and the circuit board with a silver paste or a red glue.

4. The structure as claimed in claim 1, wherein the sensing device is a CCD (charge-coupled device) or a CMOS (Complementary Metal-Oxide-Semiconductor).

* * * * *